March 17, 1942.    R. O. JOSLYN    2,276,401
WELL CLEANING APPARATUS
Filed March 18, 1940
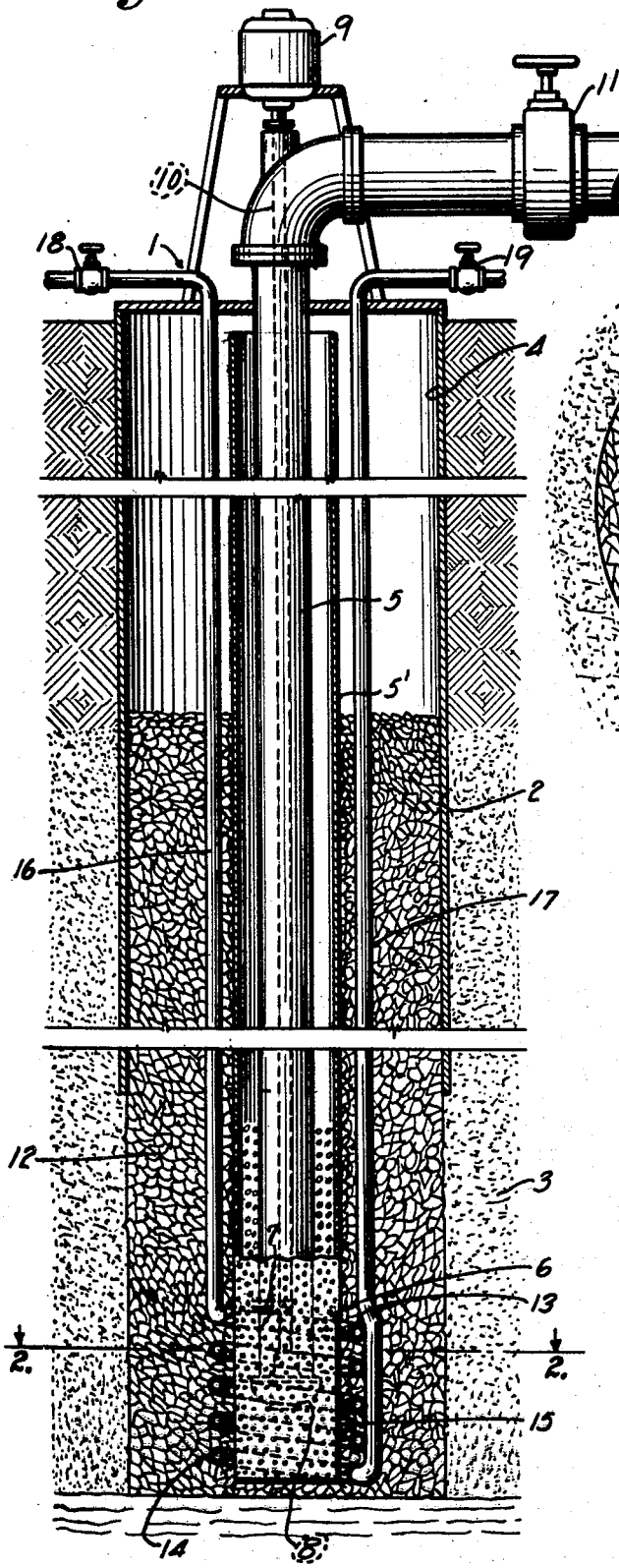
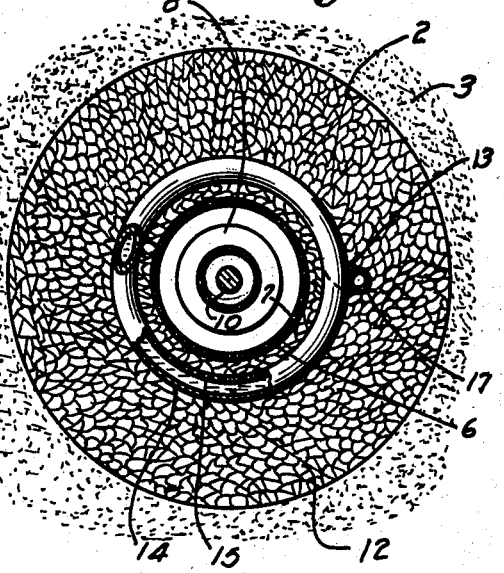
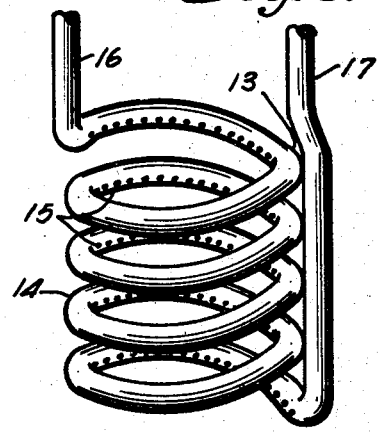
INVENTOR
Raymond O. Joslyn.
BY Arthur C. Brown
ATTORNEY

UNITED STATES PATENT OFFICE 2,276,401

WELL CLEANING APPARATUS

Raymond O. Joslyn, Kansas City, Mo., assignor to Layne & Bowler Incorporated, Memphis, Tenn., a corporation of Delaware Application March 18, 1940, Serial No. 324,625

3 Claims. (Cl. 166—20)

This invention relates to well cleaning apparatus, particularly for introducing a fluid medium, for example a solvent, into contact with material clogging the holes of a well screen and the voids or interstices in the surrounding gravel wall, and has for its principal object to provide an apparatus of this character whereby the fluid medium is effectively applied in the form of jets concentrated in close proximity of the screen.

In accomplishing these and other objects of the invention, as hereinafter pointed out, I have provided improved details of structure, the preferred form of which is illustrated in the accompanying drawing, wherein:

Fig. 1 is a vertical section through a well equipped with a cleaning apparatus embodying the features of the present invention.

Fig. 2 is a horizontal section through the well on the line 2—2 of Fig. 1.

Fig. 3 is a perspective view of the perforated duct whereby a plurality of jets are concentrated onto the exterior of a well screen.

Referring more in detail to the drawing:

1 designates a well including a bore-hole 2 extending from the surface into a water bearing formation 3. The bore-hole is provided with a casing 4 that extends through the loose formations at the upper portion of the well and terminates within the water producing sand. Extending downwardly within the well is an inner casing 5', having a screen 6 connected with its lower end and located in submergence within the well fluid. The screen has a plurality of openings 7 of suitable size to permit entrance of the well fluid but to hold back sand, gravel, and other debris collecting in the bottom of the well.

In the illustrated instance the well fluid is discharged through a pump tubing 5 by a pump 8 operated by a motor 9 at the top of the well through a shaft 10, the discharge through the tubing being controlled by a valve 11 as in conventional practice. The bore of the well is of substantially larger diameter than the inner casing 5' to provide space for the introduction of gravel or similar filtering media 12 to fill the bore of the well within the formation 3 and serve as a filter for holding back sand which would ordinarily be carried by the well fluid toward the screen. Wells of this character have relatively large flow capacities but the sand and cavings may be gradually carried by the well liquid to pack about the screen so that the holes become clogged thereby, together with chemical accumulations consisting of calcium, iron and other deposits, so that the well flow is materially reduced.

I have, therefore, provided the well with an apparatus whereby a fluid medium such as a solvent is concentrated about the outer surface of the screen so as to effectively dispose of the clogging material. In the illustrated instance the screen is encircled by a helical shaped duct 13 having a sufficient number of convolutions 14 so as to cover substantially the entire extent of the screen without blocking the flow of water thereto. The convolutions are of larger diameter than the outer diameter of the screen so that the inner faces thereof are spaced therefrom and provided with a plurality of orifices 15 through which the fluid is discharged on and through the clogging material.

The ends of the helical conduit are connected with pipes 16 and 17 which extend to the top of the well and are provided with control valves 18 and 19 respectively whereby flow of the cleansing medium may be controlled to regulate force of the jets. The cleansing medium may be continuously circulated in excess amount through the coil by admitting the cleansing medium through one of the pipes, for example 16, and returning it to the top of the well through the pipe 17.

The cleansing medium may be hot water, steam, or hydrochloric acid solution, depending upon the nature of the medium to effectively dissolve and loosen the clogging material so that it is readily removed from the well.

It is thus obvious that the applied cleansing medium is concentrated in the vicinity of the screen, and is, therefore, used most effectively and economically to readily clear the openings of the screen of the clogging material.

What I claim and desire to secure by Letters Patent is:

1. In a well, a tubing extending into the well, a screen connected with the lower end of the tubing, gravel filling space in the bottom of the well surrounding the screen, a helical duct encircling the exterior of the screen in spaced relation therewith and imbedded in the gravel surrounding the screen, said helical duct having a plurality of jet openings in the side thereof facing the screen for discharging a cleansing medium directly toward the screen to clear openings in the screen, and a pipe connected with said duct and extending to the top of the well for supplying the cleansing medium to said duct.

2. In a well, a tubing extending into the well, a screen connected with the lower end of the tubing, gravel filling space in the bottom of the well surrounding the screen, a helical duct encircling the exterior of the screen in spaced relation therewith and imbedded in the gravel surrounding the screen, said helical duct having a plurality of jet openings in the side thereof facing the screen for discharging a cleansing medium directly toward the screen to clear openings in the screen, and pipes connected with the respective ends of said duct and extending to the top of the well for circulating the cleansing medium from the top of the well through said duct by way of one of the pipes.

3. In a well, a tubing extending into the well, a screen connected with the lower end of the tubing, gravel filling space in the bottom of the well surrounding the screen, a helical duct encircling the exterior of the screen in spaced relation therewith and imbedded in the gravel surrounding the screen, said helical duct having a plurality of jet openings in the side thereof facing the screen for discharging a cleansing medium directly toward the screen to clear openings in the screen, pipes connected with the respective ends of said duct and extending to the top of the well for circulating the cleansing medium from the top of the well through said duct by way of one of the pipes, and a valve at the discharge end of the other pipe for controlling force of the jets discharged through said openings.

RAYMOND O. JOSLYN.